US012212369B2

(12) United States Patent
Tarof et al.

(10) Patent No.: US 12,212,369 B2
(45) Date of Patent: Jan. 28, 2025

(54) ELECTRO-PHOTONIC CIRCUIT COMPRISING BURST-MODE OPTICAL RECEIVER

(71) Applicant: ElectroPhotonic-IC Inc., Kanata (CA)

(72) Inventors: Lawrence E. Tarof, Kanata (CA); Vighen Pacradouni, Montreal (CA); Gudmundur A. Hjartarson, Ottawa (CA); Rony E. Amaya, Kanata (CA); Richard D. Clayton, Ottawa (CA)

(73) Assignee: ElectroPhotonic-IC Inc., Kanata (CA)

( * ) Notice: Subject to any disclaimer, the term of this patent is extended or adjusted under 35 U.S.C. 154(b) by 0 days.

(21) Appl. No.: 18/746,581

(22) Filed: Jun. 18, 2024

(65) Prior Publication Data

US 2024/0421913 A1   Dec. 19, 2024

Related U.S. Application Data

(60) Provisional application No. 63/561,461, filed on Mar. 5, 2024, provisional application No. 63/521,769, filed on Jun. 19, 2023.

(51) Int. Cl.
*H04B 10/69* (2013.01)
*H04Q 11/00* (2006.01)

(52) U.S. Cl.
CPC ......... *H04B 10/69* (2013.01); *H04Q 11/0066* (2013.01); *H04Q 11/0067* (2013.01)

(58) Field of Classification Search
CPC . H04B 10/69; H04Q 11/0066; H04Q 11/0067
See application file for complete search history.

(56) References Cited

U.S. PATENT DOCUMENTS 6,384,462 B1 *   5/2002   Pauchard ............ H01L 31/1852
                                                          257/E31.127
9,372,306 B1 *   6/2016   Nagarajan ........... H01S 5/02415
                                      (Continued)

FOREIGN PATENT DOCUMENTS

WO        2021119803 A1      6/2021

OTHER PUBLICATIONS

D. Wake, D. Moodie and F. Henkel, "The electroabsorption modulator as a combined photodetector/modulator for analogue optical systems," IEEE MTT/ED/AP/LEO Societies Joint Chapter United Kingdom and Republic of Ireland Section. 1997 Workshop on High Performance Electron Devices for Microwave and Optoelectronic App.*

(Continued)

*Primary Examiner* — Tanya T Motsinger
(74) *Attorney, Agent, or Firm* — Miltons IP/p.i.

(57) ABSTRACT

A burst-mode optical receiver for an optical line terminal (OLT) of a passive optical network (PON) comprises a variable optical attenuator (VOA), a photodiode (PD) which may be a pin-PD or an APD, a transimpedance amplifier (TIA), and a feedback/control circuit for adjusting a bias voltage of the VOA in response to a burst-mode optical input signal level, to provide an attenuated optical output signal to the PD having a narrower dynamic range. Providing signal level adjustment in the optical domain mitigates the requirement for a burst-mode TIA with a large dynamic range and provides for fast switching. The burst-mode optical receiver may comprise a waveguide configuration, wherein a first electro-absorption modulator (EAM) is operable as the VOA and a second EAM is operable as the photodiode. A monolithically integrated electro-photonic circuit comprising the VOA, PD, TIA and feedback/control circuit may be provided using InP-based semiconductor materials.

22 Claims, 13 Drawing Sheets

Optical input signal level is adjusted in the optical domain using a VOA

(56) References Cited

U.S. PATENT DOCUMENTS

| | | | |
|---|---|---|---|
| 9,722,704 B2* | 8/2017 | Saito | H04B 10/07955 |
| 10,530,484 B2* | 1/2020 | Hjartarson | H04B 10/50593 |
| 10,673,532 B2* | 6/2020 | Hjartarson | H04B 10/50593 |
| 10,693,278 B2* | 6/2020 | Watson | H01S 5/2232 |
| 11,092,762 B2 | 8/2021 | Hjartarson et al. | |
| 11,888,978 B1* | 1/2024 | Wang | H04L 9/0852 |
| 2003/0223727 A1* | 12/2003 | Soskind | G02B 6/266 385/140 |
| 2004/0062557 A1* | 4/2004 | Takashima | H04B 10/674 398/209 |
| 2008/0187323 A1* | 8/2008 | Honda | H04B 10/25133 398/208 |
| 2010/0290790 A1* | 11/2010 | Murthy | H04B 10/506 398/192 |
| 2010/0322631 A1* | 12/2010 | Nagarajan | G02B 6/12009 398/65 |
| 2012/0176667 A1* | 7/2012 | He | H04B 10/2942 359/344 |
| 2016/0170296 A1* | 6/2016 | Wang | G03F 1/76 430/5 |
| 2016/0182157 A1* | 6/2016 | Komatsu | H04B 10/674 398/202 |
| 2017/0351024 A1* | 12/2017 | Hayakawa | G02B 6/125 |
| 2020/0044747 A1* | 2/2020 | Zhang | H04B 10/69 |
| 2020/0213011 A1* | 7/2020 | Tanaka | H04B 10/0779 |
| 2020/0350992 A1* | 11/2020 | Liu | H04Q 11/0067 |
| 2021/0356249 A1* | 11/2021 | Swanson | A61B 5/0066 |
| 2022/0190550 A1* | 6/2022 | Hjartarson | H01S 5/0265 |
| 2022/0311206 A1 | 9/2022 | Clayton et al. | |
| 2023/0019783 A1* | 1/2023 | Tarof | H01L 27/1443 |

OTHER PUBLICATIONS

Nogawa, M. et al.; "10-Gbits/s Burst-mode Receiver Integrated Circuits for Broadband Optical Access Networks", NTT Technical Review, Mar. 2011, vol. 9., No. 3; pp. 1-7; available online: https://www.ntt-review.jp/archive/ntttechnical.php?contents=ntr201103fa5.html.

Tyler, N.; "Key building block for 100G PON networks unveiled" Sep. 22, 2022; 3 pages; available online: https://www.newelectronics.co.uk/content/news/key-building-block-for-100g-pon-networks-unveiled/.

Liu, J.; "Imec researchers at Ghent University and Nokia Bell Labs work to debut key building block for the deployment of 100G PON networks", Sep. 22, 2022; 1 page ; available online: https://www.imec-int.com/en/press/imec-researchers-ghent-university-and-nokia-bell-labs-work-debut-key-building-block.

Fig. B.9.1 taken from ITU-T G.9807.1 (Jun. 2016) : "10-Gigabit-capable symmetric passive optical network (XGS-PON)"; https://www.itu.int/rec/T-REC-G.9807.1-201606-S/en and subsequent revisions.

International Search Report issue on related PCT International Application No. PCT/CA2024/050824; mailed Sep. 17, 2024; 3 pages.

Rosales, R. et al.; "Achieving high budget classes in the downstream link of 50G-PON"; Journal of Optical Communications and Networking, vol. 13.; No. 8; Aug. 2021.

* cited by examiner

Relationship between ONU power levels and burst times

Optical input signal level is adjusted in the optical domain using a VOA

ELECTRO-PHOTONIC CIRCUIT COMPRISING BURST-MODE OPTICAL RECEIVER

CROSS-REFERENCE TO RELATED APPLICATION(S)

This application claims priority from U.S. provisional patent application No. 63/561,461, filed Mar. 5, 2024, entitled "Burst Mode Optical Receiver" and from U.S. provisional patent application No. 63/521,769 filed Jun. 19, 2023, entitled "Burst Mode Optical Receiver", both of which are incorporated herein by reference in their entirety.

TECHNICAL FIELD

This invention relates to electro-photonic integrated circuits comprising burst-mode optical receivers, and more particularly to electro-photonic integrated circuits comprising burst-mode optical receivers fabricated with InP-based semiconductor materials.

BACKGROUND

In a passive optical network (PON), an optical signal is sent as a burst signal from a customer's terminal, referred to as an optical network unit (ONU), to an optical line terminal (OLT) in a central office. The optical signal level from different ONUs can vary considerably. For example, optical burst signals with different signal strengths and timings are received by an OLT burst-mode receiver comprising an avalanche photodiode (APD), a transimpedance amplifier (TIA) and electronics comprising a limiting amplifier (LA) and clock and data recovery (CDR) (M. Nogawa, et al. "10-Gbits/s Burst-mode Receiver Integrated Circuits for Broadband Optical Access Networks", NTT Technical Review, March 2011, Vol. 9., no. 3). Upstream packets arriving at the OLT receiver may exhibit a large dynamic range of optical powers due to the differential path loss of the optical distribution network, variation in ONU launch powers, and distance between an ONU and OLT may range from a few hundreds of meters, up to a few tens of kilometers. These effects are compounded at higher speeds required for next-generation PONs (N. Tyler, "Key building block for 100 G PON networks unveiled", New Electronics, 23 Sep. 2022). Since the optical signal level can vary by, e.g. 21 dB, a burst-mode TIA is required, and it is difficult to set the TIA input level, requiring expensive silicon electronics. Recently, a 100 Gbit/s PAM-4 linear burst-mode transimpedance amplifier (TIA) chip fabricated with a 0.13 μm SiGe Process has been disclosed by Ghent University and Nokia Bell Labs (J. Liu, "Imec researchers at Ghent University and Nokia Bell Labs work to debut key building block for the deployment of 100 G PON networks", imec-int.com, 22 Sep. 2022).

For current and next generation PONs, alternative solutions are needed.

SUMMARY OF INVENTION

The present invention seeks to provide improved or alternative burst-mode receivers for OLT PON applications.

Aspects of the invention provide electro-photonic integrated circuits comprising a burst-mode optical receiver, and burst-mode receivers for OLT PON applications comprising a variable optical attenuator (VOA), a photodiode (PD) which may be a pin PD or an APD, a TIA, and a feedback/control circuit for adjusting bias of the VOA in response to a burst-mode optical input signal level, to provide signal level adjustment in the optical domain.

One aspect provides an electro-photonic integrated circuit comprising a burst-mode optical receiver for an Optical Line Terminal (OLT) of a Passive Optical Network (PON) comprising:
- a photodiode (PD), a Variable Optical Attenuator (VOA), a transimpedance amplifier (TIA), and a feedback/control circuit;
- the VOA having an optical input for receiving a burst-mode optical input signal and an optical output aligned to an optical aperture of the PD to provide an attenuated optical output signal from the VOA to the PD;
- wherein the feedback/control circuit is operable to adjust a bias voltage of the VOA in response to at least one of a peak value and an average value of the burst-mode optical input signal, to provide an attenuated optical output signal from the VOA to the PD, said attenuated optical output signal having a predetermined peak optical output signal level to control a photocurrent output from the PD to the TIA.

Another aspect provides an electro-photonic integrated circuit comprising a burst-mode optical receiver for an optical line terminal (OLT) of a passive optical network (PON) comprising:
- a Variable Optical Attenuator (VOA), a photodiode (PD), a transimpedance amplifier (TIA), and a feedback/control circuit,
- the VOA having an optical input for receiving a time domain multiplexed (TDM) burst-mode optical input signal from a plurality of optical network units (ONUs), wherein a peak value of the burst-mode optical input signal levels received from the plurality of ONUs has a first dynamic range;
- the feedback/control circuit comprising a detection circuit operable to detect the peak value of the burst-mode optical input signal level for each burst, and a VOA driver operable to adjust a bias voltage of the VOA in response to the peak value of each burst, to provide an attenuated output optical signal from the VOA to the PD, the attenuated output optical signal having a peak value within a second dynamic range, wherein the second dynamic range is smaller than the first dynamic range, to control a photocurrent from the PD to the TIA.

Yet another aspect provides a burst-mode optical receiver for an optical line terminal (OLT) of a passive optical network (PON) comprising:
- a photodiode (PD), a Variable Optical Attenuator (VOA), a transimpedance amplifier (TIA), and a feedback/control circuit;
- the VOA having an optical input for receiving a burst-mode optical input signal and an optical output aligned to an optical aperture of the PD to provide an attenuated optical output signal from the VOA to the PD;
- wherein the feedback/control circuit is operable to adjust a bias voltage of the VOA in response to at least one of a peak value and an average value of the burst-mode optical input signal, to provide an attenuated optical output signal from the VOA to the PD, said attenuated optical output signal having a predetermined peak optical output signal level, to control a photocurrent output from the PD to the TIA.

For example, the burst-mode optical input signal has a first dynamic range, and the attenuated optical output signal from the VOA to the PD has a second dynamic range, smaller than the first dynamic range. For example, the second dynamic range may be at least an order of magnitude smaller than the first dynamic range, or ~100 times smaller than the first dynamic range. In some embodiments, the attenuated optical output signal level may have a substantially constant peak value.

Providing signal level adjustment in the optical domain controls, e.g. limits or restricts, the photocurrent output from the PD to the TIA, and mitigates the requirement for a burst-mode TIA having a large dynamic range.

In electro-photonic-integrated circuits comprising burst-mode optical receivers of some example embodiments, a signal indicative of an input optical signal level is obtained by sampling, for each burst, e.g. during an adjustment time, an electrical output signal of the TIA using electronic circuitry comprising a peak signal and/or average signal detection circuit, which provides a control signal to a driver of the VOA, to adjust attenuation of the VOA for each burst. Alternatively, a signal indicative of an input optical signal level is obtained by sampling, for each burst, a photocurrent from the photodiode, a photocurrent from the VOA, optical sensing of the input optical signal level to the VOA or the output optical signal level from the VOA.

For example, the feedback/control circuit comprises a detection circuit operable to detect at least one of the peak value and the average value of the burst-mode optical input signal, and a VOA driver circuit operable to provide a control voltage to the VOA, the VOA driver circuit providing a control voltage to the VOA to adjust attenuation dependent on said at least one peak value and average value of the burst-mode optical signal.

The VOA is used to restrict the photo-current from the PD to a narrow current range, and therefore the TIA requires only a small dynamic range. This solution bypasses the need for a burst-mode TIA having a large dynamic range. For example, a small control circuit feeds back the output current of the PD to control the bias on the VOA, to adjust the optical input signal level as different optical channels reach the head end OLT from different ONUs.

The PD may be a surface-receiving pin PD or APD. In some embodiments, the VOA, PD and the feedback and control circuitry and TIA are monolithically integrated. In some embodiments, the VOA and PD are integrated, and the output of the PD is connected to an external circuit comprising the TIA and feedback/control circuit.

The VOA is a voltage-controlled VOA. For example, the VOA may be a Quantum Confined Stark Effect (QCSE) VOA or a Franz-Keldysh VOA. In some embodiments, the electro-photonic circuit has a waveguide configuration wherein the same semiconductor layers are used for the VOA and for the pin-PD.

In other embodiments, a standalone VOA and PD may be used as input to an external circuit comprising the TIA and feedback/control circuitry to adjust the VOA bias in response to the burst-mode input optical signal level.

In some embodiments, the burst-mode receiver has a waveguide configuration wherein the VOA comprises an electro-absorption modulator (EAM) and the PD comprises one of a pin-PD and an avalanche PD (APD). In some embodiments, the burst mode receiver has a waveguide configuration wherein the VOA comprises a first EAM operable as the VOA and the PD comprises a second EAM operable as the PD. The second EAM may be provided with a mirror comprising rear-facet metal coating, to double the transit length through the device, improving light leakage loss, while simultaneously not causing a bad reflection back to the laser providing the initial signal.

The waveguides of the first and second EAMs may comprise a Quantum-confined Stark Effect (QCSE) waveguide. The waveguides of the first and second EAMs may be laterally coupled.

In embodiments where the waveguide of the first EAM is fabricated with a first plurality of semiconductor layers and the second EAM is fabricated with a second plurality of semiconductor layers, the waveguides are vertically coupled by a laterally tapered vertical optical coupler.

The burst-mode receiver may be fabricated as an electro-photonic integrated circuit comprising III-V based semiconductor materials, e.g. using an InP-based semiconductor materials system, comprising selected binary, ternary and quaternary and other compositions of In, Ga, As, P, Al and Sb.

For example, a monolithically integrated electro-photonic circuit comprising a VOA, pin PD, TIA and feedback/control circuit may be provided using InP-based semiconductor materials.

For example, if an InP-based semiconductor materials system is used, the integrated electro-photonic circuit may be formed on a semi-insulating (SI) InP substrate, and an epitaxial layer stack is formed on the SI InP substrate, comprising a first plurality of semiconductor layers for InP Hetero-junction bipolar transistors (HBT) for the TIA and feedback/control circuit, a spacer layer, and a second plurality of semiconductor layers for the VOA waveguide and pin-PD waveguide. In some embodiments the waveguides of the VOA and the PD are laterally optically coupled. In some embodiments the waveguides of the VOA and the PD are vertically optically coupled by laterally tapered vertical optical couplers.

Electro-photonic integrated circuits comprising burst-mode optical receivers of example embodiments are described which provide optical input signal level adjustment in the optical domain; the burst-mode receiver may comprise a VOA and photodiode having a surface-receiving configuration, or a VOA and photodiode having a waveguide configuration, i.e. edge-receiving. By combining photonics and electronics, photonics are used for fast level setting in the optical domain, and fast electronics are used for data processing. For example, this configuration provides potential to reduce settling time and preserve and extend dynamic range, e.g. for applications such as 50 G PON.

The foregoing and other features, aspects and advantages will be more apparent from the following detailed description, taken in conjunction with the accompanying drawings, of example embodiments, which description is by way of example only.

DETAILED DESCRIPTION

Figure 1:
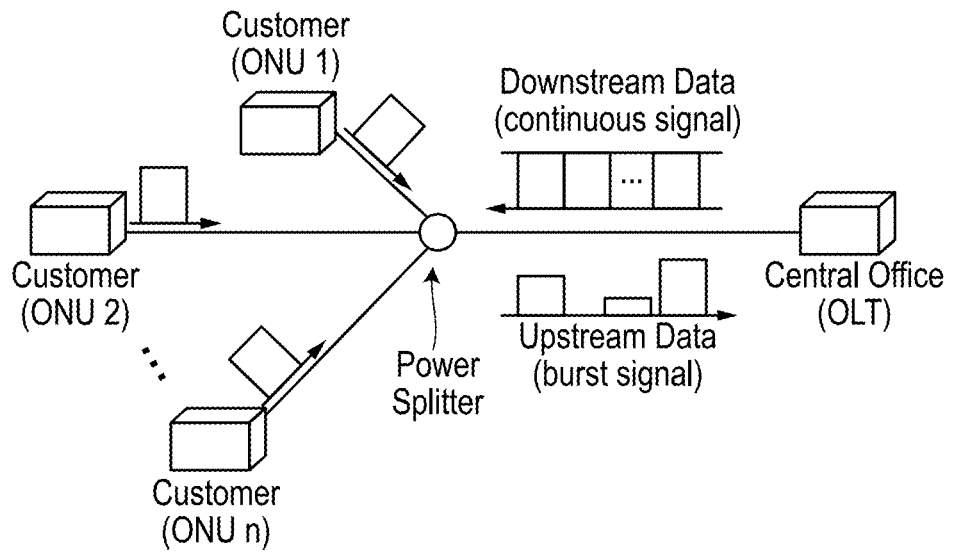
FIG. 1 is a simplified schematic diagram to illustrate an example PON system.

A simplified schematic diagram to illustrate components of a PON system is shown in FIG. 1. As illustrated schematically, the upstream data from each ONU (ONU1, ONU2, ... ONUn) arrives at the OLT in the central office as a burst signal, which can vary significantly in optical signal level, and which requires a burst-mode receiver having a large dynamic range.

Figure 2:
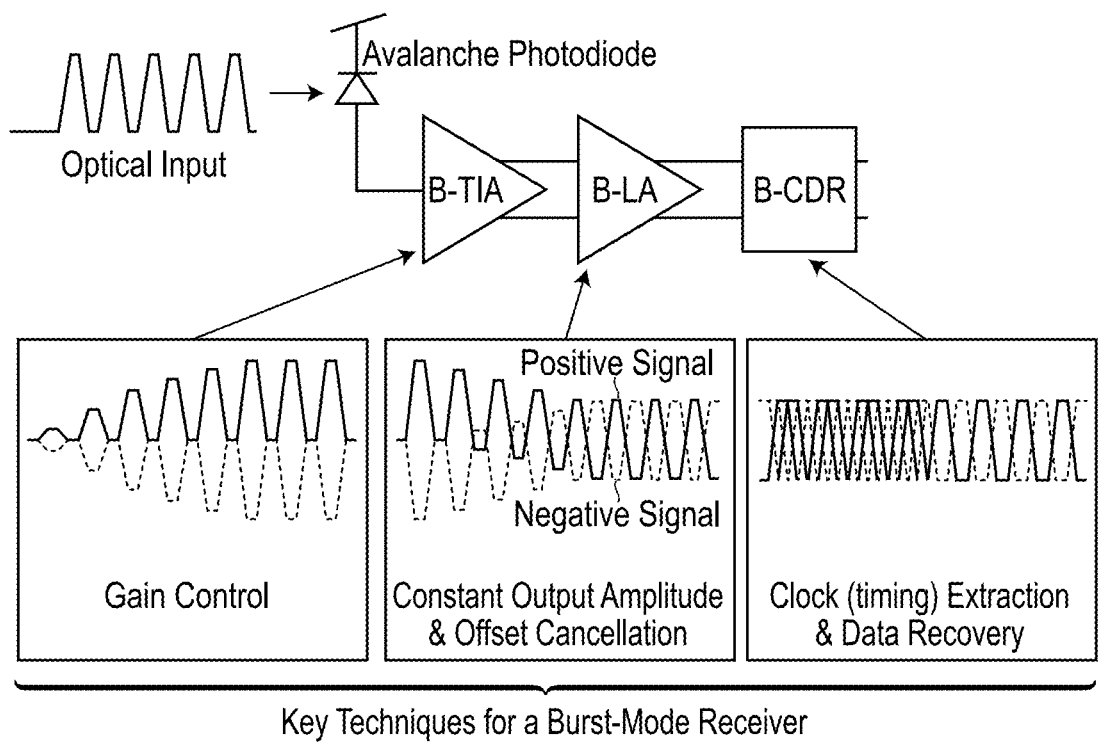
FIG. 2 (Prior Art) is a schematic diagram of an example burst-mode receiver.

FIG. 2 (Prior Art) shows an example of a schematic diagram of a burst-mode receiver comprising an APD and a burst-mode TIA (B-TIA) with variable gain and burst-mode level adjust (B-LA) electronics to adjust the signal level in the electrical domain, and provide an output signal to a burst-mode clock and data recovery (CDR) circuit.

Figure 3A:
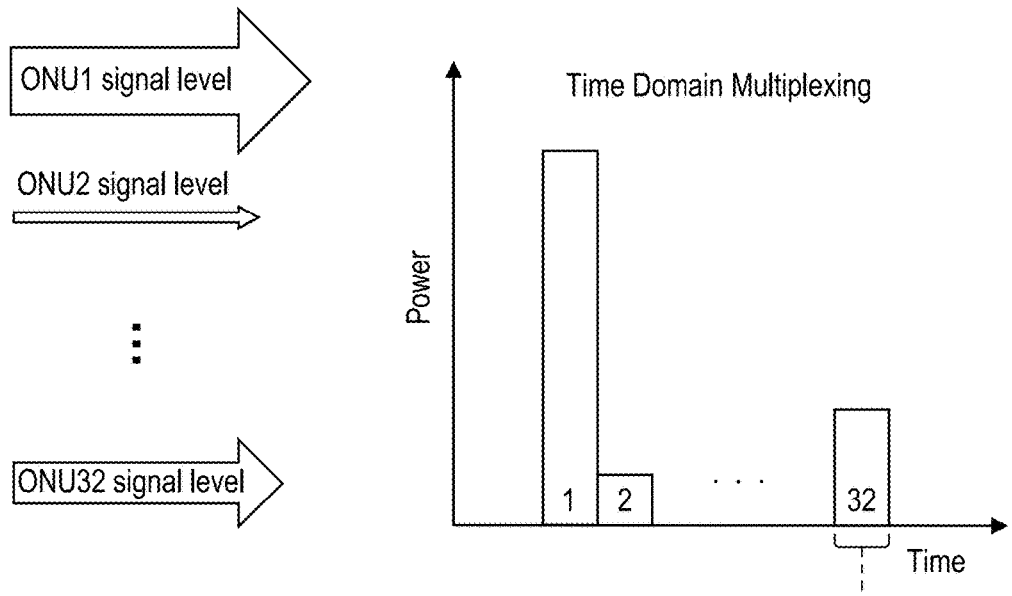
FIG. 3A is a schematic diagram to illustrate time division multiplexing (TDM) of burst-mode signals of different power levels from each ONU received at an optical input of a burst-mode receiver.
Figure 3B:
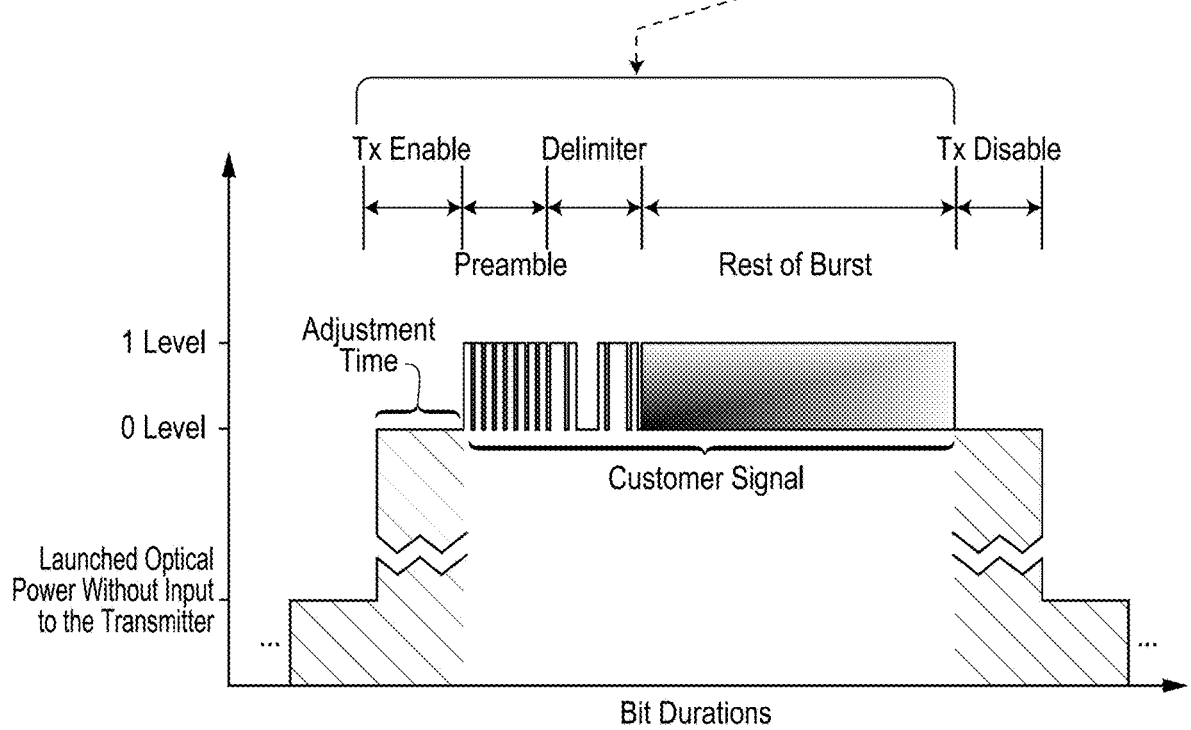
FIG. 3B is a schematic diagram to show the relationship between ONU optical power levels and burst times.

FIG. 3A is a schematic diagram to illustrate time division multiplexing (TDM) of burst-mode signals of different optical power levels from each ONU (ONU1, ONU2, ... ONU32) at the input of a burst-mode optical receiver. ONU optical signals may have a dynamic range of e.g. 20 dB, which is a 100 times disparity amongst signal levels from each ONU. It is challenging to electronically adjust the gain of the TIA fast enough to meet the requirements for 25 G PON. It becomes more challenging as speeds get even higher. FIG. 3B is a diagram adapted from FIG. B.9.1 of ITU-T G.9807.1 (06/2016): 10-Gigabit-capable symmetric passive optical network (XGS-PON), which shows the relationship between ONU power levels and burst times. For example, the adjustment time, which may be referred to as Tx enable duration or settling time, for 25 G PON may be ~50 ns. It is challenging to use electronics to provide signal level adjustments within this adjustment time. Time constraints for 50 G PON, and eventually 100 G PON, are even more challenging for solving the challenge of dynamic range.

Figure 4:
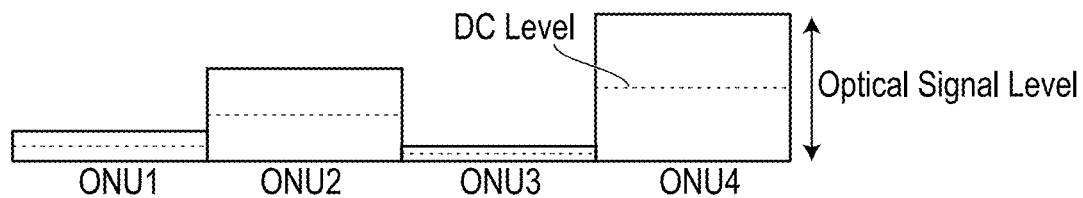
FIG. 4 is a schematic diagram to illustrate different power levels and DC levels from a plurality of ONUs at the optical input of the burst-mode receiver.
Figure 5:
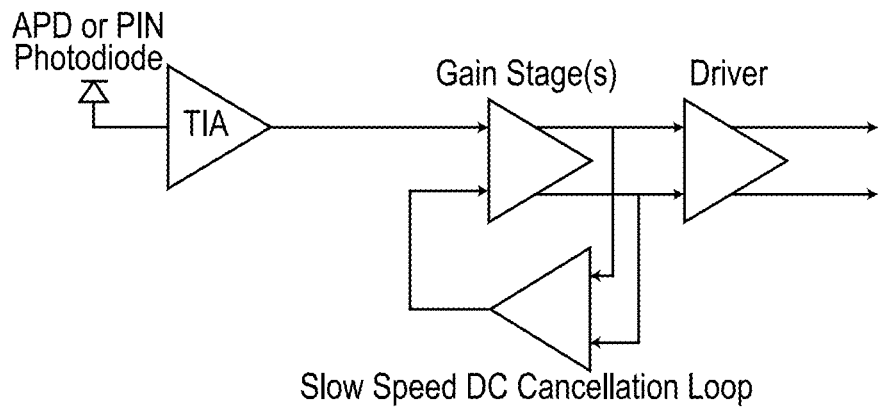
FIG. 5 (Prior Art) is a schematic circuit diagram of burst-mode optical receiver comprising a photodiode and a TIA comprising a DC cancellation loop.

FIG. 4 is a schematic diagram to illustrate different peak power levels from each ONU at the input of the TIA and different DC or average levels. FIG. 5 (Prior Art) shows a schematic circuit diagram for burst-mode optical receiver comprising a photodiode, which may be a PIN PD or an APC, and a TIA. The upstream optical signal is TDMA. Each ONU transmits on an assigned channel. Because each ONU is at a different distance and split ratio, each frame of data from individual ONUs will have different peak optical power levels, resulting in different power levels at the input of the TIA. A burst-mode TIA is designed with a large dynamic range to operate over the entire range of input levels in real time. However, optical signals have a large DC component that carries no information, typically 50% of the peak-peak AC component. The DC component can easily overwhelm the gain stages of the TIA after all of the gain has been applied. As illustrated in FIG. 5, the burst-mode TIA has a slow speed DC cancellation circuit. A negative feedback loop is applied to the circuit to "cancel" or stabilize the amount of gain the circuit has at DC. To limit this gain reduction to DC only, and not cause intermodulation with the desired AC signal, the bandwidth of the feedback loop is set very low, e.g. typically 100 kHz. In upstream burst-mode applications this slow speed DC negative feedback loop will begin to slew from burst to burst, potentially losing control of the DC gain and causing bit errors.

Figure 6:
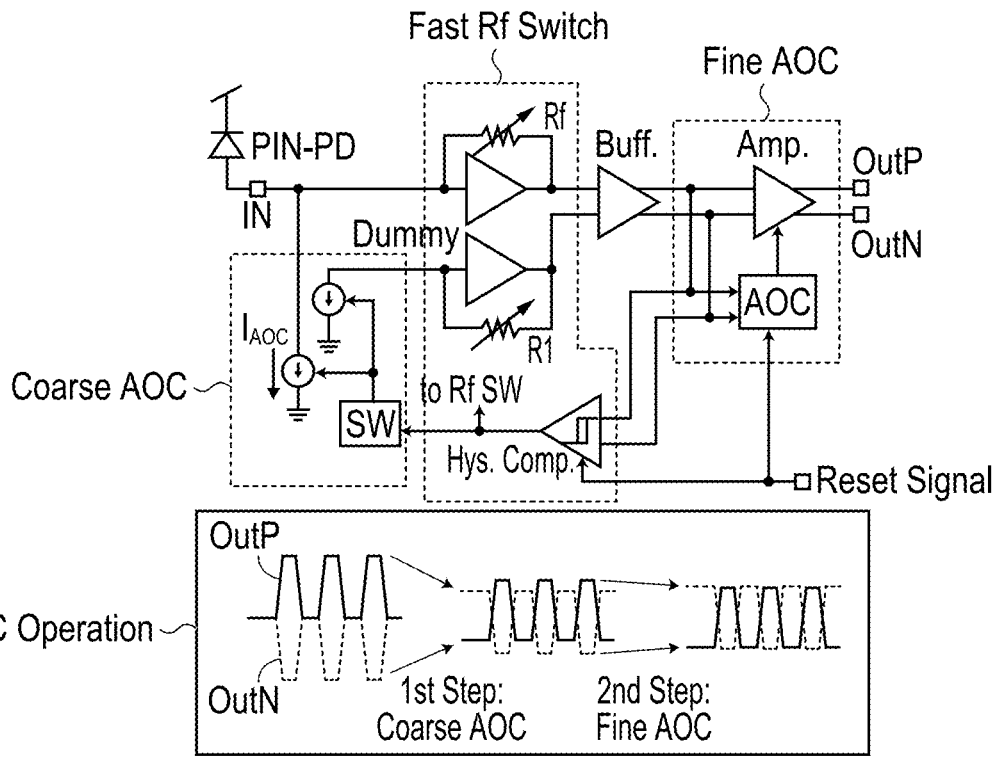
FIG. 6 (Prior Art) is a schematic circuit diagram of a burst-mode optical receiver comprising a two-step variable gain TIA.

FIG. 6 (Prior Art) shows a schematic circuit diagram for an example burst-mode optical receiver comprising a variable gain TIA. A level detection circuit at the output provides a feedback control signal to the variable gain TIA, which is implemented by variable feedback resistors. Coarse AGC is implemented by sinking photocurrent away from the input of the TIA, and fine AGC is implemented by adjusting the feedback resistors of the TIA.

Figure 7:
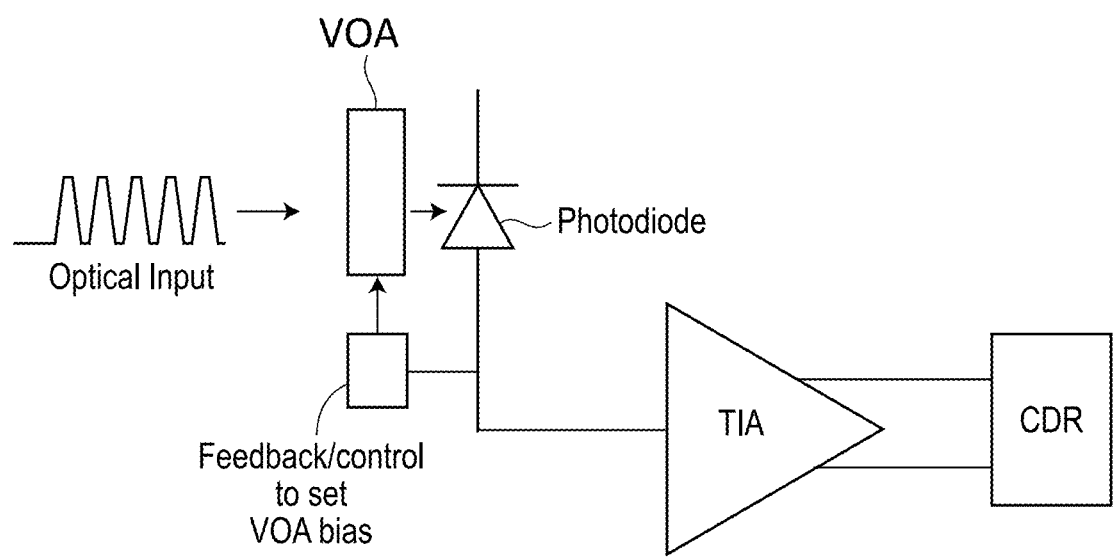
FIG. 7 is a schematic diagram to illustrate conceptually embodiments of burst-mode receiver comprising an electro-photonic circuit for adjusting the optical input signal level in the optical domain using a variable optical attenuator (VOA)

FIG. 7 is a schematic diagram to illustrate conceptually embodiments of a burst-mode receiver comprising an electro-photonic circuit for adjusting the optical input signal in the optical domain using a Variable Optical Attenuator (VOA) in front of an optical aperture of a photodiode (PD). The PD may be a pin PD, an APD or a waveguide PD. The VOA may be a QCSE (Quantum Confined Stark Effect) VOA, a Franz-Keldysh VOA or VOA controlled by a other voltage controlled photonic mechanism. The VOA in front of the optical aperture of the PD is used to attenuate the optical input signal and restrict the photo-current from the PD to a narrow current range, and therefore the TIA requires only a small dynamic range. This solution bypasses the need for a burst-mode TIA with a large dynamic range. A small control circuit feeds-back the output current of the PD to the VOA driver to control the bias (control voltage) on the VOA, for different E-fields, to adjust the attenuated optical input signal level to the PD. For example, during the adjustment time at the beginning of each burst, the feedback/control circuit samples the photo-current from the PD, and adjusts the VOA bias to provide attenuation of the optical input signal to the PD to a predetermined level, e.g. within a narrow dynamic range, or a substantially constant value. For example, if the burst-mode optical input level from a plurality of ONU has a first dynamic range, the attenuation of the VOA is adjusted for each burst to provide an attenuated optical input level to the PD with a second, narrower, dynamic range, or to provide an attenuated optical input level to the PD having a constant value.

Figure 8:
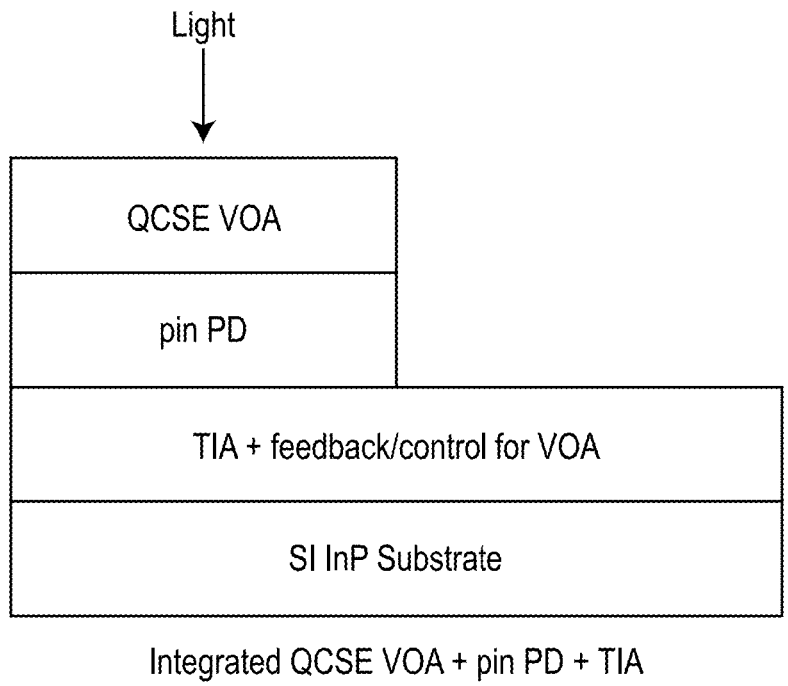
FIG. 8 is a schematic diagram of a monolithically integrated burst-mode optical receiver of a first embodiment comprising a QCSE VOA, a pin-PD, and a TIA and feedback/control circuitry.
Figure 9:
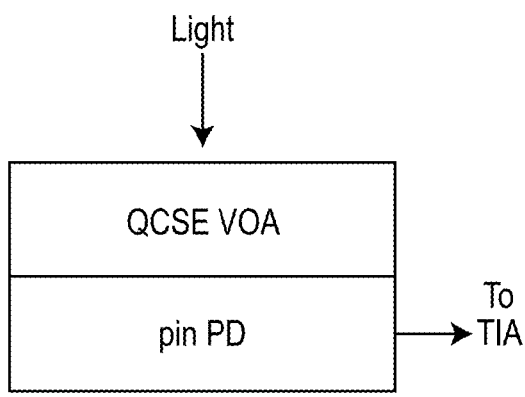
FIG. 9 is a schematic diagram of an integrated QCSE VOA and a pin-PD of a second embodiment.
Figure 10:
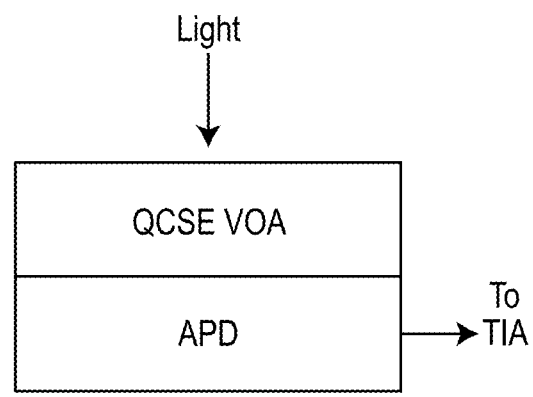
FIG. 10 is a schematic diagram of an integrated QCSE VOA and an APD of a third embodiment.

FIG. 8 is schematic diagram of a monolithically integrated burst-mode optical receiver of a first embodiment comprising a Quantum Confined Stark Effect (QCSE) VOA, a pin-PD, and TIA and feedback/control circuitry fabricated on a semiconductor substrate. For example, the burst-mode receiver may be fabricated as an electro-photonic integrated circuit using III-V semiconductor technology. For example, an integrated pin-TIA using a InP-based materials system, is described in United States patent application no. U.S. Ser. No. 17/785,989, filed Jun. 16, 2022, entitled "Optical Receiver comprising monolithically integrated photodiode and transimpedance amplifier". The monolithically integrated burst-mode optical receiver of this embodiment may be fabricated by adding semiconductor layers to provide the QCSE VOA on top of the pin PD, and adding the feedback/control circuitry in the semiconductor layers which comprise InP heterojunction bipolar transistors (HBTs) that form the TIA. Alternatively, in a second embodiment, the burst-mode receiver comprises a standalone QCSE VOA and pin PD module which provides an input to an external TIA and control circuit, as shown schematically in FIG. 9. In a third embodiment, the burst-mode receiver comprises a standalone QCSE VOA and an APD module which provides an input to an external TIA and control circuit, as shown schematically in FIG. 10.

Figure 11:
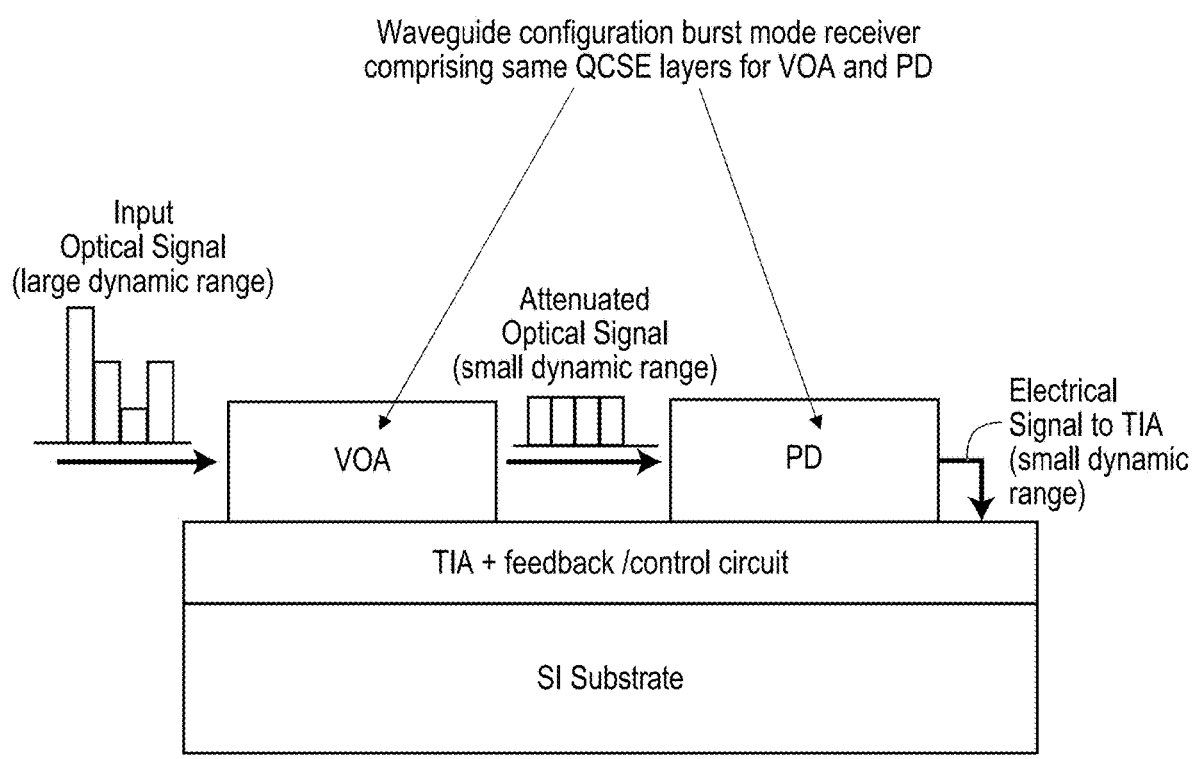
FIG. 11 is a schematic cross-sectional diagram of a monolithically integrated burst-mode optical receiver of a fourth embodiment comprising a waveguide configuration QCSE VOA and pin-PD, and TIA and feedback/control circuitry for controlling a drive voltage of the QCSE VOA.

A schematic cross-sectional diagram of a monolithically integrated burst-mode optical receiver of a fourth embodiment comprising a waveguide configuration QCSE VOA, PD, and TIA and feedback/control circuitry is shown in FIG. 11. In this embodiment, the burst-mode optical receiver has a waveguide configuration in which the same QCSE semiconductor layers are used for the VOA and the pin-PD. If fabricated from InP based semiconductor materials, the structure comprises an electro-photonic integrated circuit formed on a substrate, e.g. semi-insulating (SI) InP, and an epitaxial layer stack comprising a first plurality of semiconductor layers for fabrication of InP Heterojunction Bipolar Transistors (HBTs) for the TIA and feedback/control circuit, a spacer layer, and a second plurality of semiconductor layers for the VOA and pin-PD waveguides. In embodiments where the waveguides of the VOA and the PD are fabricated with the same semiconductor layers, the VOA and PD are directly optically coupled through the waveguide layers. In embodiments where the waveguide of the VOA comprises one plurality of semiconductor layers and the PD comprises another plurality of semiconductor layers that are vertically stacked, the VOA and PD are vertically coupled using a laterally tapered vertical optical taper. In other embodiments, when the VOA and PD are fabricated side-by-side with different semiconductor layers, the VOA and PD may be butt-coupled.

Figure 12:
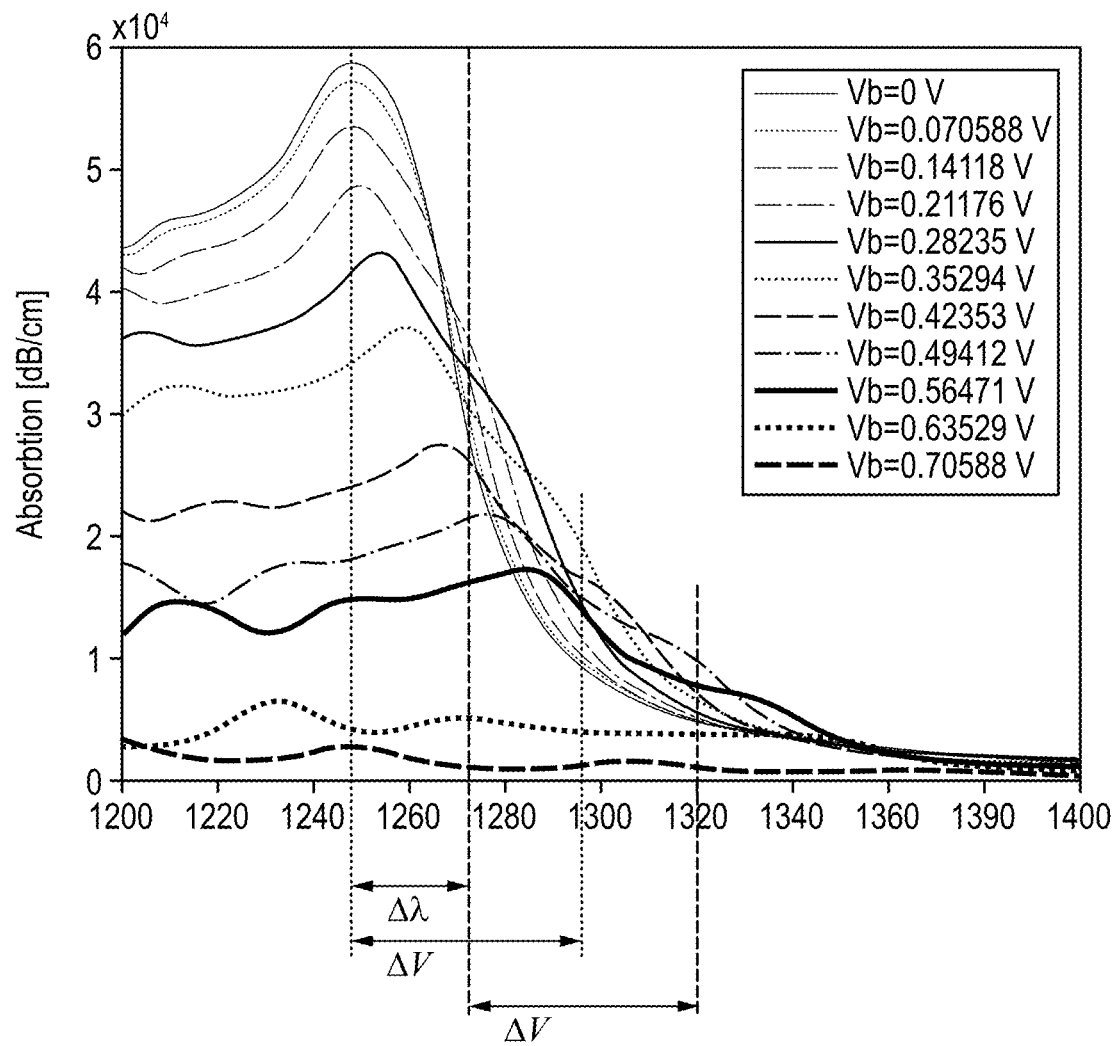
FIG. 12 shows plots of numerical simulations of absorption (dB/cm) vs. wavelength ($\lambda$) for an example QCSE VOA for different E-field biases (Vb)

FIG. 12 shows plots of numerical simulations of absorption (dB/cm) vs. wavelength ($\lambda$) for an example QCSE VOA, fabricated with InP based materials, for different E-field biases (Vb). These simulations indicate that the bias of the QCSE VOA provides sufficient range of absorption, over a useful wavelength range, for example, a 20 nm wavelength range for XG(S) PON. The less stringent requirements of 25 G PON can be covered if the third, optional, wavelength of 1286 nm is provisioned separately. Preliminary analysis indicates that the settling time of the VOA is fast enough to meet required specifications.

For normal incidence, the absorption length can be adjusted vs. QCSE absorption/dynamic range, trading-off against non-zero doping, which creates the E-field slope and additional voltage range. It should not be necessary to exceed a voltage range that is already provisioned for today's APD+burst-mode TIA solutions.

For reference, FIG. 3B shows a schematic diagram to show the relationship between ONU power levels and burst times. There is a "Tx enable" settling time for changing from one TIA input level into another. For 10 G PON this is 0.128 $\mu$s (1280 bits). This is much slower than the actual bits which allows for a factor of >1000 slower control circuitry than the signal itself.

In summary, simulations indicate the following differentiators and VOA characteristics:
- >20 nm wavelength range with both >3 dB/$\mu$m absorption and a good range of bias voltages Vb;
- With low background doping, it is expected that an appropriate level of E-field constancy over thickness of 2 $\mu$m to 3 $\mu$m can be achieved, allowing for a −7.5 dB dynamic range in one pass;
- If a VOA with higher dynamic range is needed, or to create a superior product, a resonant cavity technique could be used to boost the VOA range, with only modest Q.
- The pin-PD responsivity could also be boosted using a resonant cavity technique.

Figure 13:
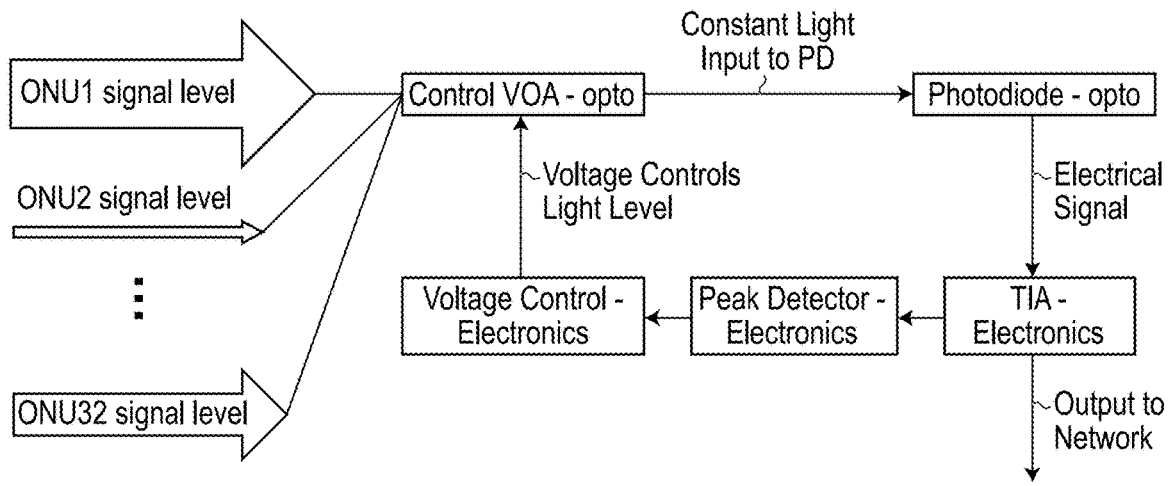
FIG. 13 is a schematic block diagram of a waveguide configuration burst-mode optical receiver of embodiments comprising a VOA, a photodiode, and feedback/control circuitry comprising a TIA, peak detector, and voltage control electronics.
Figure 14:
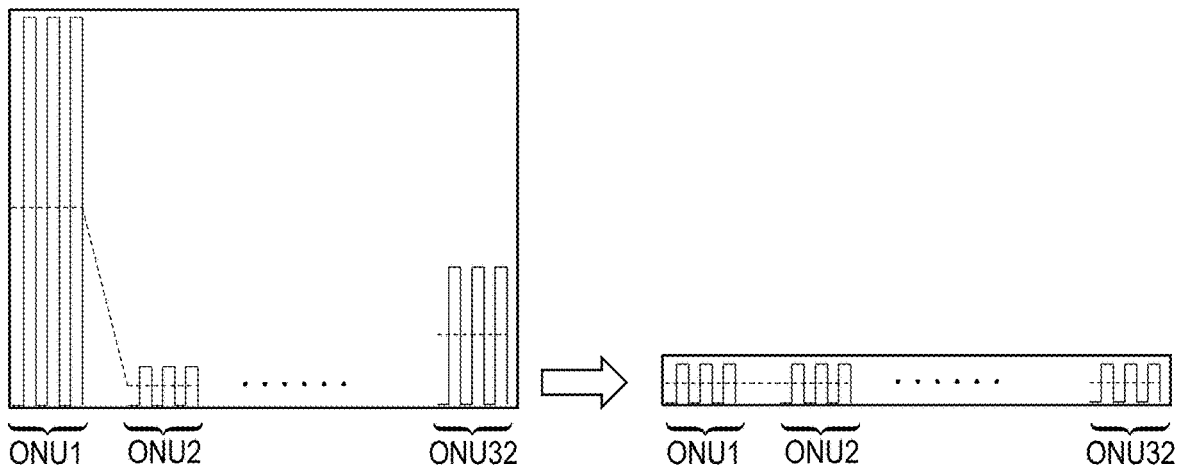
FIG. 14 is a schematic diagram to illustrate attenuation of the burst-mode optical input signals from a plurality of ONUs having a first dynamic range to provide attenuated optical signals having a second dynamic range, e.g. a substantially constant peak signal level.

FIG. 13 is a schematic block diagram of a waveguide configuration burst-mode optical receiver of embodiments comprising a VOA, a photodiode, and feedback/control circuitry comprising a TIA, a peak voltage detector, and voltage control electronics to provide a control signal to the VOA to attenuate the received optical signal to provide a constant peak light input to the photodiode. During the settling period, e.g. the Tx enable duration at the beginning of an ONU burst, the electrical signal output from the TIA is sampled by a peak voltage detector and a control voltage for the VOA is adjusted to attenuate the input light signal to the photodiode to a predetermined level, so that a substantially constant peak light input is received by the photodiode for each ONU burst, as illustrated schematically in FIG. 14. FIG. 14 shows an example frame comprising ONU burst-mode optical signal inputs from ONU1, ONU2, . . . ONU32 having a large dynamic range, and a corresponding attenuated burst-mode optical signal wherein bursts from each ONU are attenuated to a constant peak light level for input into the PD. Thus, the photocurrent output from the PD to the TIA is limited to a constant peak value, or at least limited to a small dynamic range. For example, the settling frequency for the VOA is >10 GHz, and for the control electronics is >1 GHz. By combining photonics with electronics, using the photonics for level setting in the optical domain and electronics for data, enables very fast switching, e.g. in ~50 ns, to fully adjust to ONU signals having a dynamic range of ~20 dB. This arrangement allows for the DC level of the ONU signals to be switched much faster than by using electronics alone.

The output from the TIA allows for a constant peak input signal to the clock extraction and data recovery (CDR) circuit. Use of a fast electro-photonic solution for level setting in the optical domain can preserve and extend the dynamic range of the burst-mode signal input from the ONUs, for example 21.5 dB for 10 G, 19.5 dB for 25 G. Another benefit is to reduce settling time. For example, a worst-case scenario would be 128 ns, which is common from generation to generation, but the number of bits increases. This approach allows for meeting the 256 bits objective in XGS PON (10 G), and would allow that objective to be extended and held through 25 GB, 50 GB and 100 GB.

Figure 15:
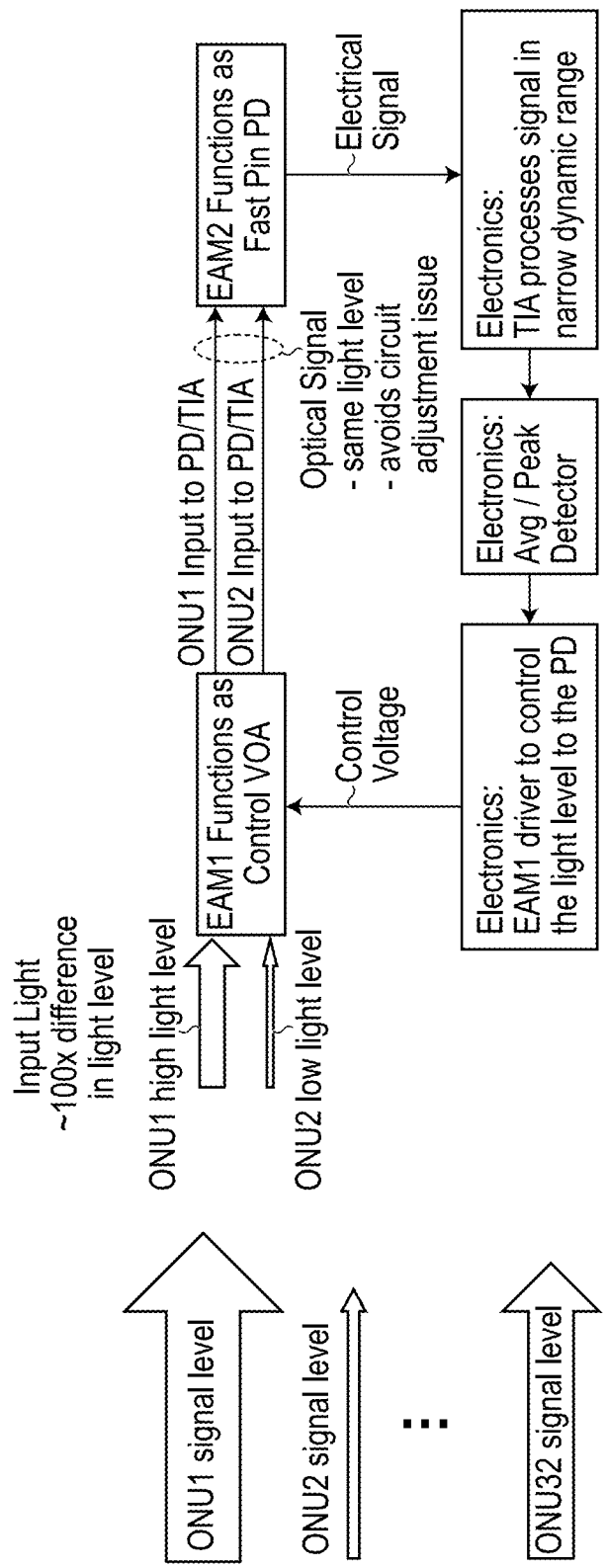
FIG. 15 is a schematic block diagram of a waveguide configuration burst-mode optical receiver of an embodiment comprising a first EAM that functions as a VOA, a second EAM that functions as a photodiode, and electronic feedback/control circuitry comprising a TIA, an average/peak detector, and voltage control electronics.

FIG. 15 is a schematic diagram of a waveguide configuration burst-mode optical receiver of an embodiment comprising a first EAM waveguide (EAM1) that is operable as a VOA, a second EAM waveguide (EAM2) that is operable as a fast pin photodiode, and electronic circuitry comprising a TIA and feedback/control circuitry comprising a peak/average signal detection circuit, and voltage control electronics to provide a control voltage to drive the VOA. The first EAM receives light from each ONU by time division multiplexing, and input light levels from different ONUs may have a dynamic range of ~20 dB or a ratio of about 100:1 from the highest input light level to the lowest input light level. During the settling time at the beginning of an ONU burst, the output of the TIA is sampled by the peak/average voltage detection circuitry, which provides a corresponding control signal to the EAM1 driver circuitry to attenuate the received light input level to a predetermined constant peak level, or at least to a narrow range of peak optical input signal levels. Since the level control is done in the optical domain, instead of the electronic domain, the photo-current from the PD is restricted to a narrower dynamic range, and the TIA processes electrical signals in a narrower dynamic range. For example, it is straightforward to design a TIA with a dynamic range between 37 GHz (50 GB) and 74 GHz (112 GB). This approach mitigates issues with electronic level adjustment within the TIA. For 224 GB and future generations, enabled by even faster transistors than commercially available today, level adjustment for burst-mode receivers becomes increasingly difficult in electronics, and providing level adjustment in the optical domain will be an advantage.

Figure 16:
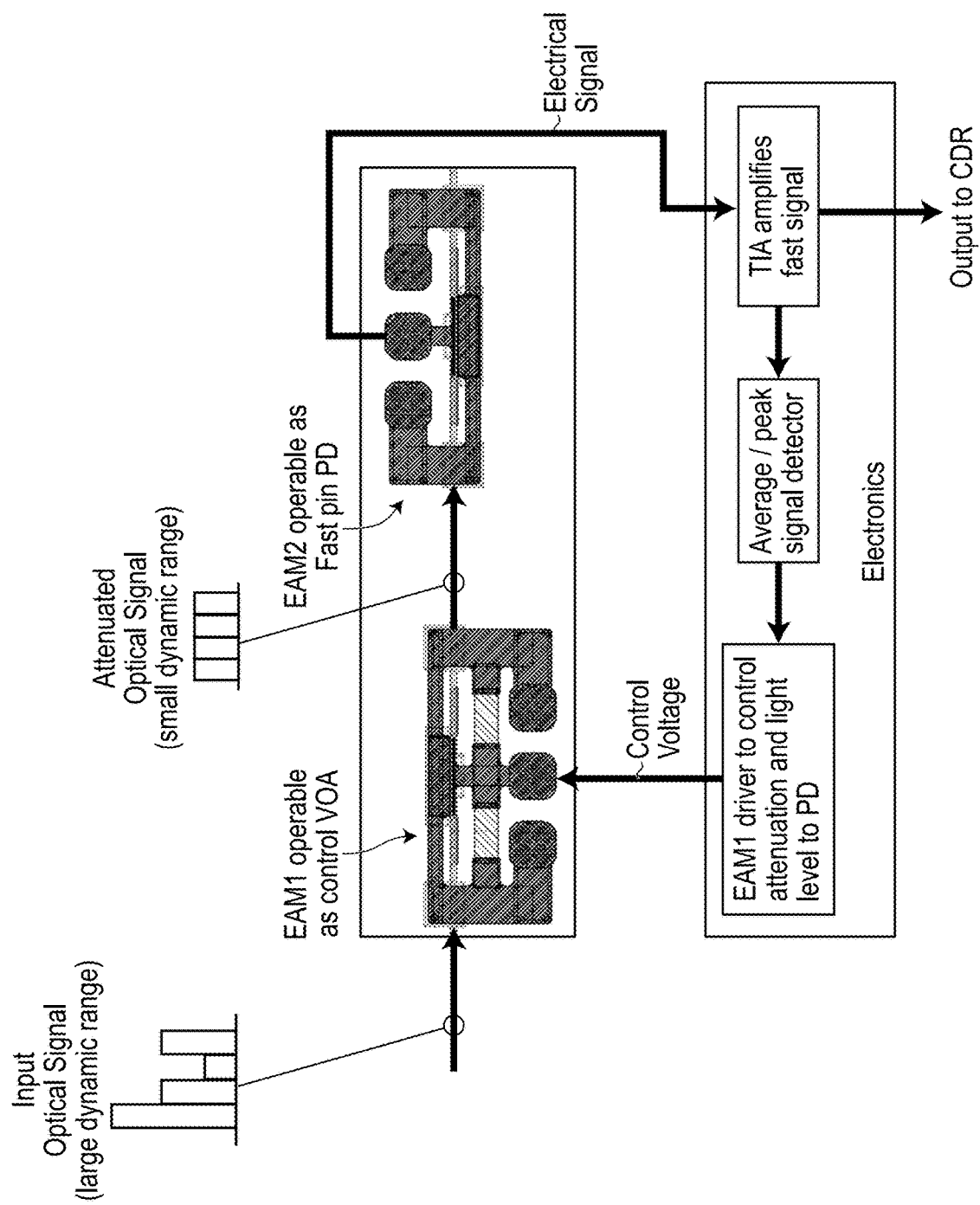
FIG. 16 is a schematic diagram of a waveguide configuration burst-mode optical receiver of another embodiment comprising an electro-photonic circuit comprising a first EAM operable as a VOA, a second EAM operable as a photodiode, and electronic feedback/control circuitry comprising a TIA, an average/peak detector, and an EAM driver comprising voltage control electronics.

FIG. 16 is a schematic diagram of a waveguide configuration burst-mode optical receiver of another embodiment comprising a first EAM (EAM1) that functions as a control VOA, a second EAM (EAM2) that functions as a photodiode, and feedback/control circuitry comprising a TIA, an average/peak detector, and an EAM driver comprising voltage control electronics. The first and second EAMs and the electronic control circuitry may be monolithically integrated on a semi-insulating substrate, as shown schematically in FIG. 11. A first plurality of semiconductor layers are configured to provide electronics for the TIA and feedback and control circuitry, and a second plurality of semiconductor layers are configured to provide an optical waveguide for the first and second EAMs. For example, a waveguide configuration burst-mode optical receiver may be fabricated with InP based semiconductor materials, e.g. as described in United States patent application no. U.S. Ser. No. 17/785, 989, filed Jun. 16, 2022, entitled "Optical Receiver comprising monolithically integrated photodiode and transimpedance amplifier". For example, if fabricated from InP based semiconductor materials, the structure comprises an electro-photonic integrated circuit formed on a substrate, e.g. SI InP, and an epitaxial layer stack comprising a first plurality of semiconductor layers for InP HBTs for the TIA and feedback/control circuit, a spacer layer, and a second plurality of semiconductor layers for the waveguides for the first and second EAMs that are operable as the VOA and PD.

Figure 17:
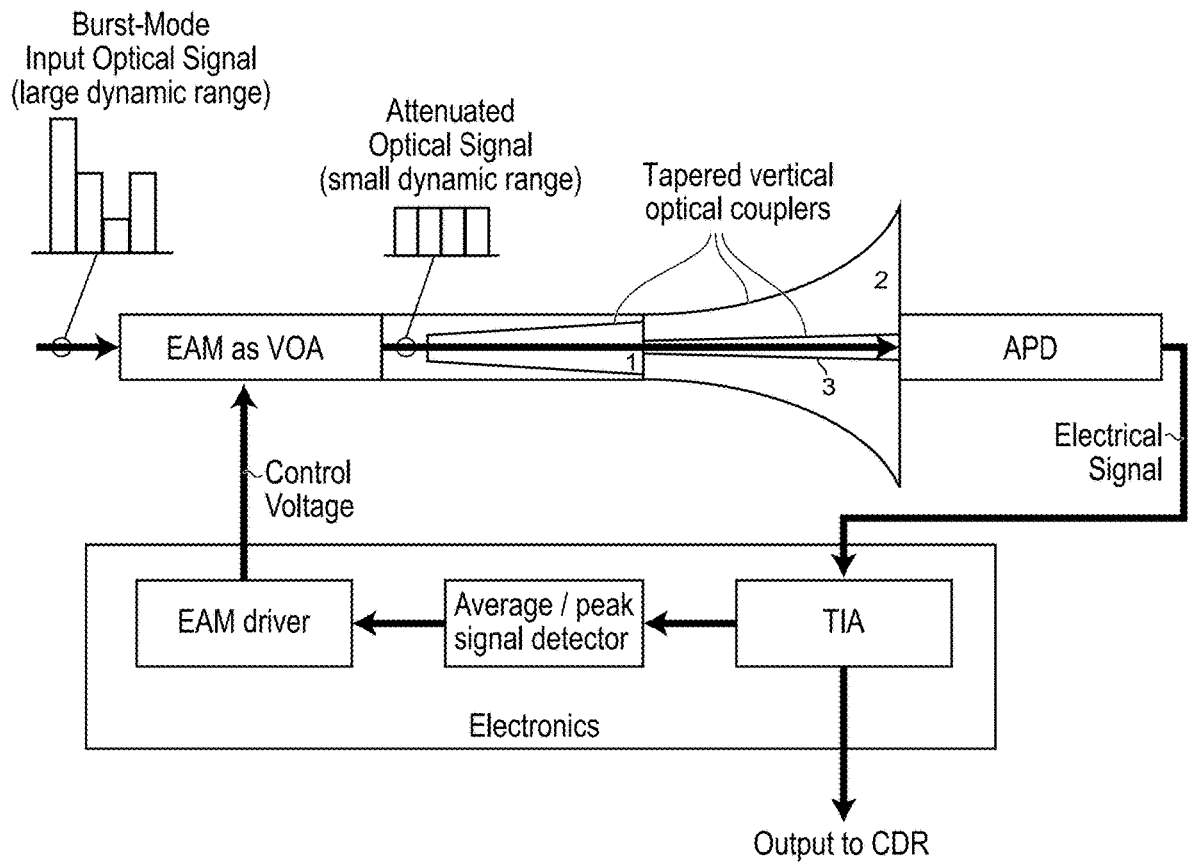
FIG. 17 is a schematic diagram of a waveguide configuration burst-mode optical receiver of yet another embodiment comprising an EAM that functions as a VOA, a waveguide APD, and electronic feedback/control circuitry comprising a TIA, an average/peak detector, and an EAM driver comprising voltage control electronics for the EAM.

FIG. 17 shows a schematic diagram of a waveguide configuration burst-mode optical receiver of a third embodiment comprising an EAM that functions as a VOA, a waveguide Avalanche Photodiode (APD), and electronics comprising a TIA and feedback/control circuitry. The feedback/control circuitry comprises an average/peak detector, and an EAM driver comprising voltage control electronics for the first EAM which is operable as a VOA.

Figure 18:
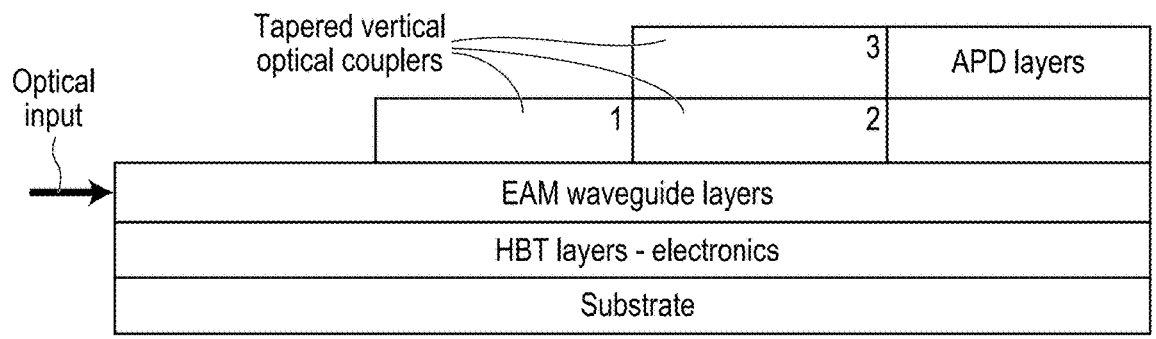
FIG. 18 is a schematic cross-sectional diagram of the waveguide configuration burst-mode optical receiver shown in FIG. 17, to illustrate vertical optical coupling of the EAM and APD using tapered vertical optical couplers.

In this embodiment, the waveguide for the VOA is fabricated with a first plurality of semiconductor layers, and the waveguide of the APD is fabricated with a second plurality of semiconductor layers. The VOA waveguide and the APD waveguide are vertically coupled by laterally tapered vertical optical couplers (1, 2, and 3). For example, FIG. 18 shows a schematic cross-sectional diagram of a monolithically integrated waveguide configuration burst-mode receiver of an embodiment comprising a plurality of semiconductor layers formed on a substrate. A first plurality of layers, HBT layers are provided for HBTs for the electronics comprising the TIA, average/peak detector and EAM driver. A second plurality semiconductor layers provide EAM waveguide layers of an EAM configured to be operable as a VOA and an overlying plurality of semiconductor layers providing a waveguide APD. The EAM and APD are vertically optically coupled by the arrangement of laterally tapered vertical optical couplers 1, 2 and 3. In other embodiments, where the APD waveguide layers are provided beneath the EAM waveguide layers, the orientation of the tapers of vertical optical couplers is reversed.

In waveguide burst mode receivers of other embodiments, the VOA waveguide and the PD waveguide may be laterally coupled as shown schematically in FIG. 11.

Figure 19:
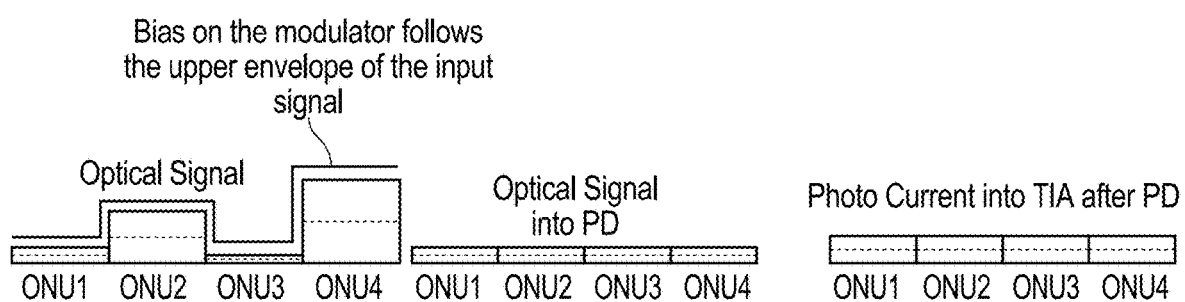
FIG. 19 is a schematic diagram to illustrate optical and electrical signal levels for a burst-mode optical receiver of example embodiments which provide a constant peak optical signal into the photodiode.
Figure 20:
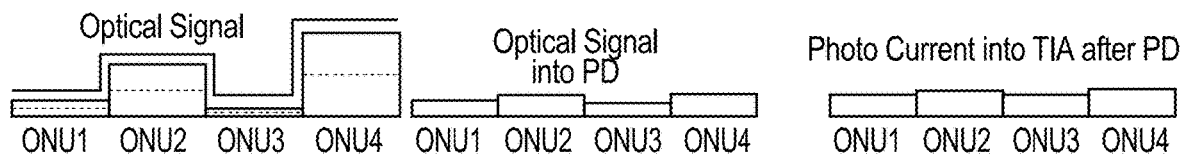
FIG. 20 is a schematic diagram to illustrate optical and electrical signal levels for a burst-mode optical receiver of example embodiments which provide a peak optical signal into the photodiode having a narrow dynamic range.

FIG. 19 shows a schematic diagram to illustrate optical and electrical signal levels for a waveguide configuration burst-mode optical receiver of an example embodiment comprising an PD. The bias on the modulator follows the upper envelope of the input optical signal. The control loop clamps the optical signal at a predetermined level, e.g. at a minimum possible, or the same as the weakest upstream level. Thus the peak optical signal into the PD from each ONU is constant, and the peak photocurrent into the TIA after the PD remains constant, or at least is constrained within a narrow dynamic range. For example, as illustrated schematically in FIG. 20, a burst mode optical input signal having a first, large, dynamic range is attenuated by controlling the drive voltage to the VOA to provide an optical signal into the PD having a second, much smaller, dynamic range, e.g. 3 dB or ~10% of the input first dynamic range. The photocurrent into the TIA from the PD therefore has a narrower dynamic range, and the TIA operates over a smaller dynamic range.

Figure 21:
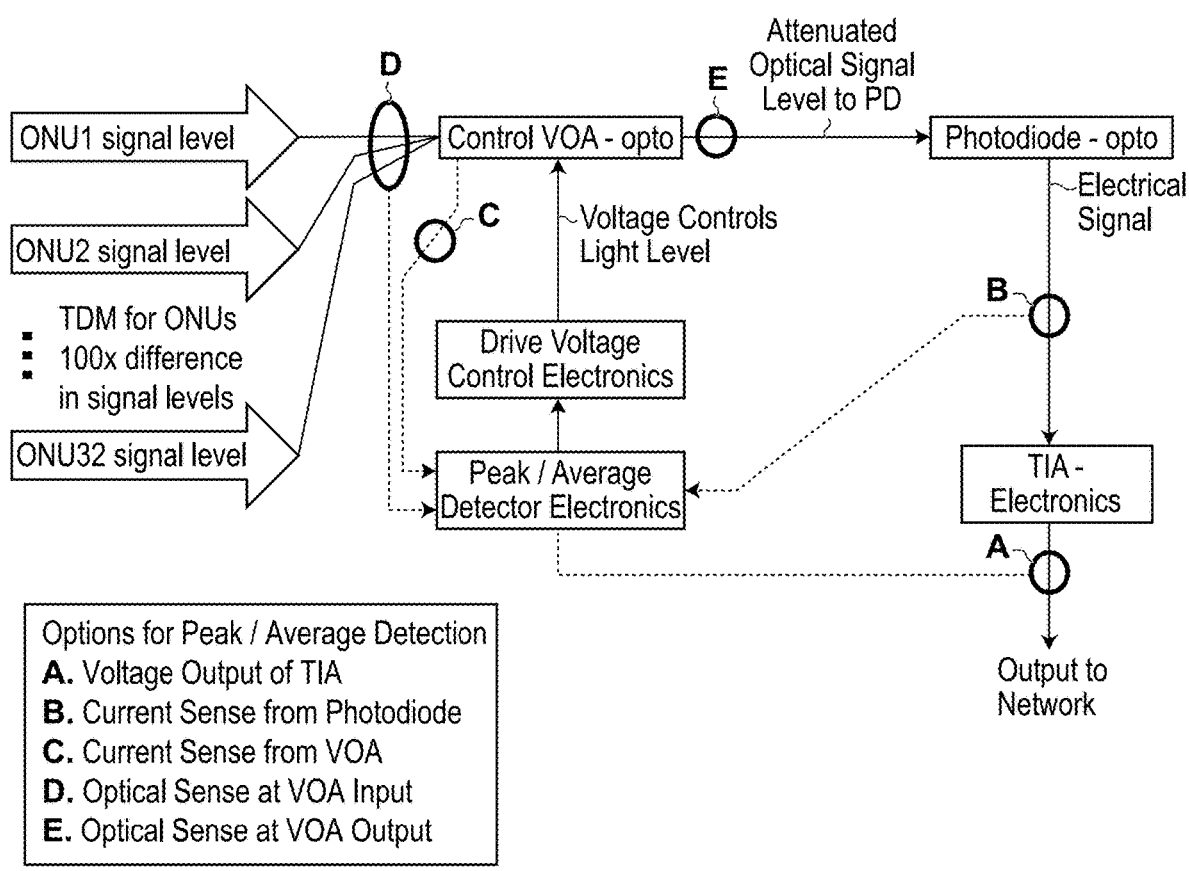
FIG. 21 is a schematic block diagram of a burst-mode optical receiver of embodiments comprising a control VOA, a photodiode, and electronic feedback/control circuitry comprising a TIA, an average/peak detector, and drive voltage control electronics to illustrate options for sensing a signal indicative of the input optical signal level to provide a drive voltage for controlling the VOA.

In operation of burst-mode receivers of example embodiments described herein the VOA drive voltage is controlled by sampling an output voltage of the TIA electronics during the adjustment time, and using electrical circuitry for peak and average signal detection to provide a control voltage to the VOA driver to attenuate the optical signal level to the photodiode to a predetermined value. In some embodiments, a signal indicative of optical input signal levels is obtained by other options. For example, as illustrated schematically in FIG. 21, a signal indicative of the peak value of the burst-mode optical input signal may be obtained by one of: A. sampling the output voltage of the TIA; B. sensing the output current of the photodiode, e.g. using a current mirror or other current sense electronics; C. monitoring a photocurrent of the control VOA; D. optical monitoring of the input optical signals at the input of the control VOA; and E. optical monitoring at the optical output of the control VOA. The signal indicative of the peak value of the burst-mode optical input signal is monitored during the adjustment time, or periodically, during each burst, is fed to the peak detection circuit, and processed to generate a control signal to the VOA driver circuit to output a control voltage to the VOA to control attenuation of the burst-mode input optical signal.

Burst-mode optical receivers of embodiments which use a first EAM as a VOA and a second EAM as a PD incur some losses in the first and second EAMs. On the other hand, in practice sensitivity may not be an issue; for example there may be a trade off in 3 dB sensitivity to achieve fast processing of input optical signals from ONUs having a significantly higher dynamic range. Where higher sensitivity is required, embodiments comprising a VOA configured as a VOA and a APD may be used, e.g. as illustrated schematically in FIG. 17 and FIG. 18.

Burst-mode optical receivers of embodiments which use a first EAM as a VOA and a second EAM as a PD incur some losses in the first and second EAMs. On the other hand, in practice sensitivity may not an issue; for example there may be a trade off in 3 dB sensitivity to achieve fast processing of input optical signals from ONUs having a significantly higher dynamic range. Where higher sensitivity is required, embodiments comprising a VOA configured as a VOA and a APD may be used, e.g. as illustrated schematically in FIG. 17 and FIG. 18.

In embodiments where the PD is an EAM, e.g. as illustrated schematically in FIGS. 15 and 16, a mirror comprising a rear-facet metal coating may be provided to double the transit through the device, improving light leakage loss, while simultaneously not causing a bad reflection back to the laser that provides the initial signal.

For burst-mode optical receivers of embodiments in which the VOA is a first EAM and the PD is a second EAM, each of which are QCSE EAMs, having waveguides fabricated with the same QSCE semiconductor layers for the VOA and PD, these may be directly optically coupled by the waveguide. For burst-mode optical receivers of embodiments in which a pin PD or an APD is provided in waveguide form, fabricated with a layer stack comprising a first plurality of semiconductor layers and the EAM is configured as the VOA fabricated with a second plurality of semiconductor layers, a laterally tapered vertical optical coupler is used to vertically couple the optical output of the VOA to the PD or APD In other embodiments, the VOA is alternatively a Mach-Zehnder Modulator (MZM).

Electro-photonic integrated circuits comprising burst-mode optical receivers of example embodiments may comprise fast electro-photonics for level setting in the optical domain using a sampling circuit comprising a peak voltage detector or an average voltage detector, for sampling an output signal of the TIA during a settling time (e.g. during a Tx enable period), or sampling periodically to follow the upper envelope of the input optical signal level.

Although example embodiments have been described and illustrated in detail, it is to be clearly understood that the same is by way of illustration and example only and not to be taken by way of limitation, the scope of the present invention being limited only by the appended claims.

The invention claimed is:

1. An integrated electro-photonic circuit comprising a burst-mode optical receiver for an Optical Line Terminal (OLT) of a Passive Optical Network (PON) comprising:
   a photodiode (PD), a Variable Optical Attenuator (VOA), a transimpedance amplifier (TIA), and a feedback/control circuit;
   the VOA having an optical input for receiving a burst-mode optical input signal and an optical output aligned to an optical aperture of the PD to provide an attenuated optical output signal from the VOA to the PD;
   wherein the feedback/control circuit is operable to adjust a bias voltage of the VOA in response to at least one of a peak value and an average value of the burst-mode optical input signal, to provide an attenuated optical output signal from the VOA to the PD, to control a photocurrent from the PD to the TIA;
   wherein the burst-mode optical input signal level has a first dynamic range, and the attenuated optical output signal level from the VOA to the PD has a second dynamic range smaller than the first dynamic range.

2. The integrated electro-photonic circuit of claim 1, wherein the second dynamic range is at least an order of magnitude smaller than the first dynamic range.

3. The integrated electro-photonic circuit of claim 1, wherein the second dynamic range is ~100 times smaller than the first dynamic range.

4. The integrated electro-photonic circuit of claim 1, wherein the attenuated output signal level has a constant peak value.

5. The integrated electro-photonic circuit of claim 1, wherein the PD is one of: a pin PD and an avalanche photo-diode (APD).

6. The integrated electro-photonic circuit of claim 1, wherein the PD is a surface receiving PD, and the VOA is integrated with the PD.

7. The integrated electro-photonic circuit of claim 6, wherein the VOA is a Quantum-Confined Stark Effect (QCSE) VOA integrated with the PD.

8. The integrated electro-photonic circuit of claim 1, wherein the VOA is one of: a Quantum-Confined Stark Effect (QCSE) VOA, a Franz-Keldysh VOA, and a VOA operable with another voltage controlled photonic mechanism.

9. The integrated electro-photonic circuit of claim 1, wherein the PD, the VOA, the TIA and the feedback/control circuit are monolithically integrated.

10. The integrated electro-photonic circuit of claim 1, having a waveguide configuration, wherein the VOA comprises a first electro-absorption modulator (EAM) operable as the VOA, and the PD comprises one of: a pin-PD and avalanche PD (APD).

11. The integrated electro-photonic circuit claim 1, having a waveguide configuration, wherein the VOA comprises a first electro-absorption modulator (EAM) operable as the VOA, and the PD comprises a second EAM operable as the PD.

12. The integrated electro-photonic circuit of claim 11, wherein the second EAM is provided with a mirror comprising rear-facet metal coating.

13. The integrated electro-photonic circuit of claim 11, wherein waveguides of each of the first and second EAMs are laterally coupled.

14. The integrated electro-photonic circuit of claim 11, wherein waveguides of each of the first and second EAMs comprise a Quantum-Confined Stark Effect waveguide.

15. The integrated electro-photonic circuit of claim 11, wherein waveguides of the first EAM comprises a first plurality of semiconductor layers, and the waveguide of the second EAM comprises a second plurality of semiconductor layers, and the waveguides of the first and second EAMS are vertically coupled by a laterally tapered vertical optical coupler.

16. The integrated electro-photonic circuit of claim 1, wherein the feedback/control circuit comprises a detection circuit for detecting said at least one of the peak value and the average value of the burst-mode optical input signal, and a VOA driver circuit to provide a control voltage to the VOA, the VOA driver circuit providing a control voltage to the VOA to adjust attenuation dependent on said at least one of the peak value and average value of the burst-mode optical input signal.

17. The integrated electro-photonic circuit of claim 16, wherein during an adjustment time, the detection circuit is operable to sample a signal indicative of a burst-mode input optical signal level, for each burst, comprising an electrical output signal of the TIA.

18. The integrated electro-photonic circuit of claim 16, wherein during an adjustment time, the detection circuit is operable to sample a signal indicative of a burst-mode input optical signal level, for each burst, comprising one of: a photocurrent of the PD; a photocurrent of the VOA; a voltage output of the TIA; an optical signal level at the VOA input; and an optical signal level at the VOA output.

19. The integrated electro-photonic circuit of claim 1, fabricated as a monolithically integrated electro-photonic circuit comprising III-V based semiconductor materials.

20. The integrated electro-photonic circuit of claim 1 fabricated as a monolithically integrated electro-photonic circuit comprising an InP-based semiconductor materials system, comprising selected binary, ternary and quaternary and other compositions of In, Ga, As, P, Al and Sb.

21. The integrated electro-photonic circuit of claim 1, fabricated as a monolithically integrated electro-photonic circuit comprising an InP-based semiconductor materials system, comprising selected binary, ternary and quaternary and other compositions of In, Ga, As, P, Al and Sb, and comprising a semi-insulating (SI) InP substrate, an epitaxial layer stack formed on the SI InP substrate, comprising a first plurality of semiconductor layers providing InP Heterojunction Bipolar Transistors (HBTs) of the TIA and the feedback/control circuit, a spacer layer, and a second plurality of semiconductor layers forming a waveguide of the VOA and a waveguide of the PD.

22. An electro-photonic integrated circuit comprising a burst-mode optical receiver for an optical line terminal (OLT) of a passive optical network (PON) comprising:
 a Variable Optical Attenuator (VOA), a photodiode (PD), a transimpedance amplifier (TIA), and a feedback/control circuit,
 the VOA having an optical input for receiving a time domain multiplexed (TDM) burst-mode optical input signal from a plurality of optical network units (ONUs), wherein a peak value of the burst-mode optical input signal levels received from the plurality of ONUs has a first dynamic range;
 the feedback/control circuit comprising a detection circuit operable to detect the peak value of the burst-mode optical input signal level for each burst, and a VOA driver operable to adjust a bias voltage of the VOA in response to the peak value of each burst, to provide an attenuated output optical signal from the VOA to the PD, the attenuated output optical signal having a peak value within a second dynamic range, wherein the second dynamic range is smaller than the first dynamic range, to limit a peak value of a photocurrent from the PD to the TIA.

* * * * *